United States Patent
Lundqvist et al.

(10) Patent No.: US 10,623,977 B2
(45) Date of Patent: Apr. 14, 2020

(54) MINIMIZATION OF DRIVE TESTS MEASUREMENT METHOD, USER EQUIPMENT, AND NETWORK DEVICE

(71) Applicant: Huawei Technologies Co., Ltd., Shenzhen (CN)

(72) Inventors: Henrik Lundqvist, Kista (SE); Xiaodong Yang, Beijing (CN); Hongzhuo Zhang, Shanghai (CN); Xiao Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 412 days.

(21) Appl. No.: 14/744,163

(22) Filed: Jun. 19, 2015

(65) Prior Publication Data
US 2015/0289157 A1  Oct. 8, 2015

Related U.S. Application Data

(63) Continuation of application No. PCT/CN2012/087196, filed on Dec. 21, 2012.

(51) Int. Cl.
*H04W 24/10* (2009.01)
*H04W 88/06* (2009.01)
*H04W 88/08* (2009.01)

(52) U.S. Cl.
CPC ......... *H04W 24/10* (2013.01); *H04W 88/06* (2013.01); *H04W 88/08* (2013.01)

(58) Field of Classification Search
CPC ...... H04W 24/10; H04W 88/06; H04W 88/08
(Continued)

(56) References Cited

U.S. PATENT DOCUMENTS

2006/0007919 A1* 1/2006 Steinheider ........... H04W 92/12
                                                                    370/352
2008/0159232 A1* 7/2008 Thalanany ........ H04W 36/0016
                                                                    370/332
(Continued)

FOREIGN PATENT DOCUMENTS

CN       101998463 A      3/2011
CN       102056216 A      5/2011
(Continued)

*Primary Examiner* — Mong-Thuy T Tran
(74) *Attorney, Agent, or Firm* — Leydig, Voit & Mayer, Ltd.

(57) ABSTRACT

Embodiments of the present application provide a minimization of drive tests measurement method and apparatus. The method includes: determining, by a user equipment, according to an MDT triggering parameter, whether to acquire an MDT measurement value, where the MDT triggering parameter includes at least one of the following: an SINR, a data rate, a packet loss rate of a voice service, a data packet latency, or service interruption time; acquiring, by the user equipment, the MDT measurement value when it is determined to acquire the MDT measurement; and sending, by the user equipment, the MDT measurement value to a network side. The minimization of drive tests measurement methods and devices in the embodiments of the present application are capable of avoiding that a user equipment reports a large amount of useless information, and reducing burdens on an air interface and a network side.

13 Claims, 10 Drawing Sheets

(58) Field of Classification Search
USPC .......................................................... 455/419
See application file for complete search history.

(56) References Cited

U.S. PATENT DOCUMENTS

| | | | | |
|---|---|---|---|---|
| 2011/0294508 A1* | 12/2011 | Min | ................... | H04W 36/0083 |
| | | | | 455/436 |
| 2012/0039365 A1* | 2/2012 | Suzuki | .................... | G01S 19/05 |
| | | | | 375/147 |
| 2012/0040621 A1* | 2/2012 | Jung | ..................... | H04W 24/10 |
| | | | | 455/67.11 |
| 2012/0106386 A1* | 5/2012 | Johansson | ............. | H04W 24/10 |
| | | | | 370/252 |
| 2012/0252471 A1* | 10/2012 | Futaki | ................... | H04W 24/10 |
| | | | | 455/450 |
| 2012/0322386 A1* | 12/2012 | Yi | .......................... | H04W 24/08 |
| | | | | 455/67.11 |
| 2013/0012188 A1 | 1/2013 | Gao et al. | | |
| 2013/0053017 A1* | 2/2013 | Chang | .................. | H04W 24/10 |
| | | | | 455/422.1 |
| 2013/0084910 A1* | 4/2013 | Suzuki | .................. | H04W 24/02 |
| | | | | 455/515 |
| 2013/0121204 A1* | 5/2013 | Lee | ........................ | H04W 24/10 |
| | | | | 370/252 |
| 2013/0190009 A1* | 7/2013 | Johansson | ........... | H04W 64/003 |
| | | | | 455/456.1 |
| 2013/0208641 A1* | 8/2013 | Baghel | ................ | H04W 76/048 |
| | | | | 370/311 |
| 2013/0281063 A1* | 10/2013 | Jactat | ..................... | H04W 24/10 |
| | | | | 455/411 |
| 2014/0248868 A1* | 9/2014 | Wang | .................... | H04W 24/10 |
| | | | | 455/422.1 |
| 2015/0126205 A1* | 5/2015 | Kim | ....................... | H04W 24/10 |
| | | | | 455/450 |

FOREIGN PATENT DOCUMENTS

| | | |
|---|---|---|
| CN | 102149106 A | 8/2011 |
| CN | 102149108 A | 8/2011 |
| CN | 102209343 A | 10/2011 |
| CN | 102547840 A | 7/2012 |
| CN | 102752787 A | 10/2012 |
| CN | 102752789 A | 10/2012 |

* cited by examiner

MINIMIZATION OF DRIVE TESTS MEASUREMENT METHOD, USER EQUIPMENT, AND NETWORK DEVICE

CROSS-REFERENCE

This application is a continuation of International Patent Application No. PCT/CN2012/087196, filed on Dec. 21, 2012, which is hereby incorporated by reference in its entirety.

TECHNICAL FIELD

The present application relates to the communications field, and in particular, to a minimization of drive tests measurement technology.

BACKGROUND

In a radio communications system, an operator needs to invest a large amount of labor at network planning, deployment, optimization, and maintenance stages. Particularly, at the optimization and maintenance stages, to ensure coverage performance of a network, generally, various parameters of the network are collected in a drive test manner and then are processed off-line, so as to discover a network problem. This manner is not only of high costs and low efficiency, but also makes it difficult to locate a problem and requires a fairly long period to discover and solve a problem. In addition, it is quite difficult to directly respond to a single user's complaint, thereby leading to low user satisfaction.

To resolve these problems, a minimization of drive tests ("MDT" for short) measurement technology is introduced to Rel-10 in the 3rd Generation Partnership Project ("3GPP" for short). The MDT technology uses a method that a user equipment ("UE" for short) is configured on a network to report measurement information, so that manual drive test work is reduced, and radio measurement information of an area that a common drive test cannot reach can be obtained. By using the MDT measurement technology to collect information, operation and maintenance costs of the operator can be greatly reduced, a problem discovering period can be shortened, and user satisfaction can be improved.

MDT measurement is classified into two types, immediate minimization of drive tests (Immediate MDT) and logged minimization of drive tests (Logged MDT). The immediate minimization of drive tests refers to performing, by a user equipment in radio resource control ("RRC" for short) RRC connected mode, MDT measurement and reporting to a base station. The logged minimization of drive tests refers to performing, by a user equipment in idle state, MDT measurement and reporting measurement information to a base station when subsequently accessing a network again.

However, after the user equipment is activated on a network side to perform the MDT measurement, the user equipment acquires an MDT measurement value according to configuration of the network side and reports an MDT measurement volume that may be unnecessary or does not timely report a necessary MDT measurement value to the network side. Thus, air interface overhead is increased, a processing burden of the network side is aggravated, so that the network side cannot more quickly respond to a network problem that may be faced by the user equipment.

SUMMARY

Embodiments of the present application provide a minimization of drive tests measurement method, a user equipment, and a network device, which are capable of avoiding that a user equipment reports a large amount of useless information in an air interface and a network side.

In a first aspect, an MDT measurement method is provided and includes:

determining, by a user equipment according to an MDT triggering parameter, whether to acquire an MDT measurement value, where the MDT triggering parameter includes at least one of the following: a signal to interference plus noise ratio (SINR for short), a data rate, a packet loss rate of a voice service, a data packet latency, or service interruption time;

acquiring, by the user equipment, the MDT measurement value when it is determined to acquire the MDT measurement; and sending, by the user equipment, the MDT measurement value to a network side.

With reference to the first aspect, in a first possible implementation manner of the first aspect, before the determining, by a user equipment according to an MDT triggering parameter, whether to acquire an MDT measurement value, the method further includes:

receiving, by the user equipment, the MDT triggering parameter sent by the network side.

With reference to the first aspect or the first possible implementation manner of the first aspect, in a second possible implementation manner of the first aspect, the MDT measurement value includes at least one of the following: location information of the user equipment, reference signal received power RSRP of a serving cell, an SINR of the serving cell, RSRP of a neighboring cell, an SINR of the neighboring cell, service throughput, a service delay, and a service type.

In a second aspect, an MDT measurement method is provided and includes:

sending an MDT triggering parameter to a user equipment, where the MDT triggering parameter includes at least one of the following: a signal to interference plus noise ratio SINR, a data rate, a packet loss rate of a voice service, a data packet delay, and service interruption time; and receiving an MDT measurement value sent by the user equipment, where the MDT measurement value is acquired by the user equipment when the user equipment determines to acquire the MDT measurement value according to the MDT triggering parameter.

With reference to the second aspect, in a first possible implementation manner of the second aspect, before the receiving an MDT measurement value sent by the user equipment, the method further includes:

determining the user equipment according to at least one of the following: a capability of the user equipment, a version of the user equipment, a remaining battery level of the user equipment, and strength of an uplink transmit signal of the user equipment.

With reference to the second aspect or the first possible implementation manner of the second aspect, in a second possible implementation manner of the second aspect, the method further includes:

sending the MDT measurement value to a trace collection entity ("TCE" for short).

With reference to the second aspect, the first possible implementation manner of the second aspect, or the second possible implementation manner of the second aspect, in a third possible implementation manner of the second aspect, the MDT measurement value includes at least one of the following: location information of the user equipment, reference signal received power RSRP of a serving cell, an SINR of the serving cell, RSRP of a neighboring cell, an SINR of the neighboring cell, service throughput, a service delay, and a service type.

In a third aspect, a user equipment is provided and includes:

a determining unit, configured to determine, according to a minimization of drive tests MDT triggering parameter, whether to acquire an MDT measurement value, where the MDT triggering parameter includes at least one of the following: a signal to interference plus noise ratio SINR, a data rate, a packet loss rate of a voice service, a data packet delay, or service interruption time;

an acquiring unit, configured to acquire the MDT measurement value when the determining unit determines to acquire the MDT measurement value; and a sending unit, configured to send the MDT measurement value acquired by the acquiring unit to a network side.

With reference to the third aspect, in a first possible implementation manner of the third aspect, the user equipment further includes:

a receiving unit, configured to receive the MDT triggering parameter sent by the network side.

With reference to the third aspect or the first possible implementation manner of the third aspect, in a second possible implementation manner of the third aspect, the MDT measurement value includes at least one of the following: location information of the user equipment, reference signal received power RSRP of a serving cell, an SINR of the serving cell, RSRP of a neighboring cell, an SINR of the neighboring cell, service throughput, a service delay, and a service type.

In a fourth aspect, a network device is provided and includes:

a sending unit, configured to send an MDT triggering parameter to a user equipment, where the MDT triggering parameter includes at least one of the following: a signal to interference plus noise ratio SINR, a data rate, a packet loss rate of a voice service, a data packet delay, and service interruption time; and a receiving unit, configured to receive an MDT measurement value sent by the user equipment, where the MDT measurement value is acquired by the user equipment when the user equipment determines to acquire the MDT measurement value according to the MDT triggering parameter.

With reference to the fourth aspect, in a first possible implementation manner of the fourth aspect, the network device further includes: a determining unit, configured to determine, before the sending unit sends the MDT triggering parameter to the user equipment, the user equipment according to at least one of the following: a capability of the user equipment, a version of the user equipment, a remaining battery level of the user equipment, and strength of an uplink transmit signal of the user equipment.

With reference to the fourth aspect or the first possible implementation manner of the fourth aspect, the sending unit is further configured to send the MDT measurement value to a trace collection entity TCE.

Therefore, in the embodiments of the present application, a user equipment determines, according to an MDT triggering parameter, whether to acquire an MDT measurement value, where the MDT triggering parameter includes at least one of the following: a signal to interference plus noise ratio SINR, a data rate, a packet loss rate of a voice service, a data packet delay, or service interruption time; and when it is determined to acquire the MDT measurement, the user equipment acquires the MDT measurement value and sends the MDT measurement value to a network side. Because the MDT triggering parameter is directly related to experience of the user equipment, the user equipment is capable of determining, according to the MDT triggering parameter related to the experience of the user equipment, whether it is necessary to acquire the MDT measurement value currently; and when the user equipment needs to acquire MDT measurement result, the user equipment acquires the MDT measurement value and reports the MDT measurement value to the network side, instead of simply performing an MDT task and reporting the MDT measurement value according to configuration on the network side without considering the experience of the user equipment in the prior art. In this way, burdens on an air interface and the network side can be reduced, a network problem faced by the user equipment can be responded to more quickly, and user experience can be improved.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

It should be understood that the technical solutions in the embodiments of the present application may be applied to various communications systems, such as a Global System for Mobile Communications ("GSM" for short) system, a Code Division Multiple Access ("CDMA" for short) system, a Wideband Code Division Multiple Access ("WCDMA" for short) system, General Packet Radio Service ("GPRS" for short) system, a Long Term Evolution ("LTE" for short) system, an LTE frequency division duplex ("FDD" for short) system, LTE time division duplex ("TDD" for short) system, and a Universal Mobile Telecommunications System ("UMTS" for short), Wireless Fidelity ("WIFI" for short) system, a mobile data access system, and a fixed network Internet Protocol (Internet Protocol, "IP" for short) access system.

A user equipment (User Equipment, "UE" for short) may also be called a mobile terminal (Mobile Terminal), a mobile user equipment, or the like. It is capable of communicating with one or more core networks by using a radio access network (for example, radio access network (Radio Access Network, "RAN" for short)). The user equipment may be a mobile terminal, such as a mobile phone (or called a "cellular" phone), or a computer with a mobile terminal. For example, the user equipment may be a portable, pocket-sized, handheld, computer-embedded, or vehicle-mounted mobile apparatus, which exchanges voice and/or data with the radio access network.

It should further be understood that in the embodiments of the present application, a base station may be a base transceiver station (Base Transceiver Station, "BTS" for short) in the GSM or the CDMA, a NodeB (NodeB, "NB" for short) in the WCDMA, or an evolved NodeB ("eNB or eNodeB" for short) in the LTE, which is not limited in the present application.

Figure 1:
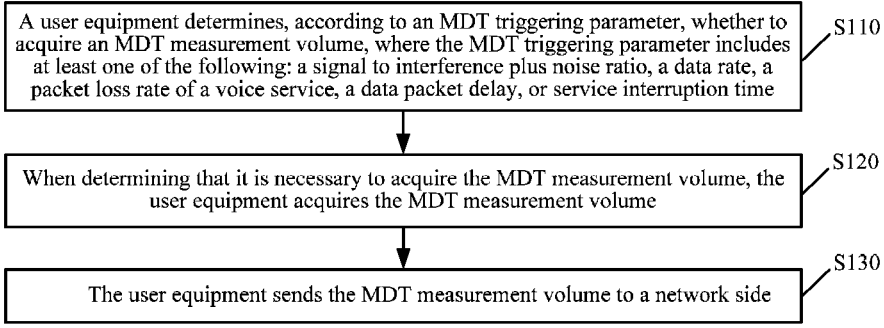
FIG. 1 is a schematic flowchart of an MDT measurement method according to an embodiment of the present application.

FIG. 1 is a schematic flowchart of an MDT measurement method 100 according to an embodiment of the present application. As shown in FIG. 1, the method 100 includes:

S110: A user equipment determines, according to an MDT triggering parameter, whether to acquire an MDT measurement value, where the MDT triggering parameter includes at least one of the following: a signal to interference plus noise ratio, a data rate, a packet loss rate of a voice service, a data packet latency, or service interruption time.

S120: When it is determined to acquire the MDT measurement, the user equipment acquires the MDT measurement value.

S130: The user equipment sends the MDT measurement value to a network side.

Specifically, the user equipment may determine, according to the MDT triggering parameter, whether it is necessary to acquire the MDT measurement value. For example, when the MDT triggering parameter meets a condition set in a system, the user equipment is capable of acquiring the MDT measurement value and sending the MDT measurement value to the network side, where the network side may be a base station or an element management system (Element Management System, "EMS" for short). The base station or the EMS may further send the MDT measurement value to a trace collection entity (Trace Collection Entity, "TCE" for short), so that the TCE is capable of processing a network problem according to the MDT measurement value. For example, the TCE determines, according to the MDT measurement value, a part of a network on which a problem occurs, so as to implement network problem locating, such as combining multiple cells to implement network problem locating. Certainly, a person skilled in the art may understand that the base station or the EMS itself may also directly implement the network problem locating according to the MDT measurement value, which is not described in detail herein.

In this embodiment of the present application, the MDT triggering parameter is used as a basis for determining, by the user equipment, whether to acquire the MDT measurement value. It includes but is not limited to the signal to interference plus noise ratio, the data rate, the packet loss rate of the voice service, the data packet latency, or the service interruption time (such as interruption time of the voice service or interruption time of a data service). When the MDT triggering parameter meets a preset condition set in the system, the user equipment is capable of acquiring the MDT measurement value and sending the MDT measurement value to the network side, where the preset condition may be formulated according to an operator's policy, system bandwidth, a user requirement, a system configuration requirement, a capability of the user equipment, and the like, and may be a threshold or a value set. This is not limited in this embodiment of the present application.

In this embodiment of the present application, for a different network device (such as a base station) or a different user equipment, the MDT triggering parameter may be different, and the preset condition corresponding to the different MDT triggering parameter may also be different. For example, for a base station providing a service for a densely populated place, a requirement on a network condition is relatively high, the preset condition corresponding to the SINR or the data rate may be set to a relatively high value, and the preset condition corresponding to the packet loss rate of the voice service or the data packet latency may be set to a relatively low value. For a base station providing a service for a sparsely populated place, a requirement on the network condition is relatively low, the preset condition corresponding to the SINR or the data rate in the MDT triggering parameter may be set to a relatively low value, and the preset condition corresponding to the packet loss rate of the voice service or the data packet latency may be set to a relatively high value. For another example, for a user equipment with a relatively high capability (for example, whether multi-antenna transmission is supported or a cache size, etc), the preset condition corresponding to the SINR or the data rate may be set to a relatively low value, and the preset condition corresponding to the packet loss rate of the voice service or the data packet latency may be set to a relatively high value; and for a user equipment with a relatively low capability, the preset condition corresponding to the SINR or the data rate may be set to a relatively high value, and the preset condition corresponding to the packet loss rate of the voice service or the data packet latency may be set to a relatively low value.

In this embodiment of the present application, the MDT measurement value may include: location information of the user equipment, reference signal received power (Reference Signal Received Power, RSRP for short) of a serving cell, an SINR of the serving cell, RSRP of a neighboring cell, an SINR of the neighboring cell, service throughput, a service latency, a service type (such as a name of the service type and a category to which the service type belongs), or the like, where the service type may be a voice service or a data service, such as web browsing, video streaming, a VoIP (Voice over Internet Protocol) service, a social network, instant messaging, file transfer, and gaming, etc.

In this embodiment of the present application, the user equipment may determine, according to an indication about MDT content to be measured, the MDT measurement value that needs to be acquired. For example, if the network side may need to learn only information about the serving cell, the user equipment may acquire, according to the indication about MDT content to be measured, only the RSRP of the serving cell and the SINR of the serving cell.

In this embodiment of the present application, the user equipment may determine, according to the indication about the MDT content to be measured, whether a currently available measurement value exists. If a currently available measurement value exists, currently available measurement result can be directly read and sent to the base station; and if no currently available measurement result exists, the user equipment performs MDT measurement, acquires a measurement value that needs to be acquired, and sends the measurement result to the base station.

In this embodiment of the present application, before S110, the method 100 may further include:

receiving, by the user equipment, an instruction, where the instruction is used to indicate the MDT triggering parameter that needs to be used when the user equipment determines whether it is necessary to acquire the MDT measurement value, and the instruction may be various messages delivered by the network side to the user equipment in the prior art, or may be dedicated signaling used to indicate the MDT triggering parameter that needs to be used when the user equipment determines whether it is necessary to acquire the MDT measurement value, which is not limited herein.

Specifically, the MDT triggering parameter may be actively sent by the base station to the user equipment, for example, the base station sends the MDT triggering parameter to the user equipment by using log measurement configuration information, a radio resource control (Radio Resource Control, RRC for short) connection reconfiguration message, or one or more other RRC messages, and may also be sent by the element management system (Element Management System, "EMS" for short) to the user equipment by using the base station. As an example, the EMS may send the MDT triggering parameter to the base station by using a trace session activation message, and then the base station forwards the MDT triggering parameter to the user equipment; the MDT triggering parameter may be configured for the user equipment by using a manual instruction by using a human-computer interaction interface of the user equipment, or may be preconfigured during delivery of the user equipment; and this embodiment of the present application is not limited thereto.

In combination with two implementation manners, the following describes in detail the MDT measurement method 100 according to this embodiment of the present application, so as to understand the MDT measurement method in this embodiment of the present application more clearly.

In an implementation manner, when determining that MDT measurement needs to be performed for a cell served by a certain base station (such as a newly deployed base station, a randomly selected base station, or a base station that needs to be optimized), an EMS may send a trace session activation message to the base station, where the trace session activation message may carry MDT configuration information that includes an MDT triggering parameter and an indication about MDT content to be measured, and the MDT triggering parameter may include at least one of the following: a signal to interference plus noise ratio, a data rate, a packet loss rate of a voice service, a data packet latency, or service interruption time. After receiving the trace session activation message sent by the EMS, the base station may select a corresponding user equipment according to the trace session activation message, such as a user equipment with no less than 50% of a battery level, a user equipment whose strength of an uplink transmit signal is lower than a certain set threshold, a randomly selected user equipment, or a user equipment whose version and capability meet a certain requirement, and send the MDT configuration information to the selected user equipment. The MDT configuration information may be sent by using log measurement configuration information, a RRC connection reconfiguration message, or one or more other RRC messages. After the user equipment receives the MDT configuration information sent by the base station, and when the MDT triggering parameter included in the MDT configuration information meets a preset condition of a system, the user equipment may acquire an MDT measurement value that needs to be measured and is indicated by the indication about the MDT content to be measured. For example, the MDT measurement value may include location information of the user equipment, RSRP of a serving cell, an SINR of the serving cell, RSRP of a neighboring cell, an SINR of the neighboring cell, service throughput, a service delay, or a service type (such as a service name of the service type and a category to which the service type belongs). After acquiring the MDT measurement value, the user equipment may send the MDT measurement value to the base station or the network management system. Further, the base station may send the MDT measurement value to a TCE, so that the TCE performs network problem locating, network optimization, or the like. A person skilled in the art may understand that the TCE may be an independent server or may serve as a part forming the base station or the EMS.

In another implementation manner, when determining that MDT measurement needs to be performed for a cell served by a certain base station (such as a newly deployed base station, a randomly selected base station, or a base station that needs to be optimized), an EMS may select a certain user equipment (such as a user equipment with a sufficient battery level, a user equipment which reports a relatively weak signal, a randomly selected user equipment, or a user equipment whose version and capability meet a certain requirement) under the base station, and then a trace session activation message that carries MDT configuration information and information about the selected user equipment may be sent in turn by a home subscriber server ("HSS" for short) and a mobility management entity ("MME" for short) to a base station corresponding to the selected user equipment, where the MDT configuration information includes an MDT triggering parameter and an indication about MDT content to be measured, and the MDT triggering parameter may include at least one of the following: a signal to interference plus noise ratio, a data rate, a packet loss rate of a voice service, a data packet latency, or service interruption time. After receiving the trace session activation message sent by the EMS, the base station may send, according to the trace session activation message, the MDT configuration information to the user equipment selected by the EMS, where the MDT configuration information may be sent by using log measurement configuration information, a radio resource control RRC protocol connection reconfiguration message, or one or more other RRC messages. After receiving the MDT configuration information sent by the base station, the user equipment may determine, according to the MDT triggering parameter included in the MDT configuration information, whether it is necessary to acquire an MDT measurement value; and when it is determined to acquire the MDT measurement, the user equipment may acquire the MDT measurement value based on a measurement value that indicated by the indication about the MDT content to be measured, such as location information of the user equipment, RSRP of a serving cell, an SINR of the serving cell, RSRP of a neighboring cell, an SINR of the neighboring cell, service throughput, a service delay, or a service type (such as a service name of the service type and a category to which the service type belongs), where the indication about the MDT content to be measured is included in the MDT configuration information. The user equipment may send the MDT measurement value to the base station. Further, the base station may send the MDT measurement value to a TCE, so that the TCE performs network problem locating, network optimization, or the like.

It should be understood that in this embodiment of the present application, when determining that it is necessary to perform MDT measurement for a cell served by a certain base station and when selecting a user equipment that is under the base station and needs to perform the MDT measurement, an EMS may randomly select the user equipment, select the user equipment based on a capability, a version, and the like of the user equipment, or select the user equipment based on a remaining battery level or strength of an uplink transmit signal of the user equipment. Similarly, if the user equipment that needs to perform the MDT measurement is selected by the base station, the base station may randomly select the user equipment, select the user equipment based on a capability, a version, and the like of the user equipment, or select the user equipment based on a remaining battery level or strength of an uplink transmit signal of the user equipment. When the selection is performed based on the remaining battery level of the user equipment, the base station or the EMS may estimate the battery level of the user equipment according to information reported by the user equipment served by the base station or the EMS, and may select a user equipment with a sufficient battery level (for example, the battery level is not less than 50%) to perform the MDT measurement. A network problem occurs more easily in cell coverage in which the user equipment with a relatively weak uplink transmit signal is located. When the selection is performed based on signal strength of the user equipment, the base station or the EMS may select, according to the strength of the uplink transmit signal of the user equipment, a user equipment corresponding to a relatively weak uplink transmit signal to perform the MDT measurement, so that the network problem can be located more timely and accurately.

In this embodiment of the present application, when the MDT triggering parameter meets the preset condition of the system, a current RRC connection may be interrupted, and therefore, before the sending the MDT measurement value to a network side in S130, the method 100 may include:

determining, by the user equipment, whether the RRC connection is available; and sending, by the user equipment, the MDT measurement value to the network side when determining that the RRC connection is available.

That is, after acquiring the MDT measurement value, the user equipment may first determine whether the current RRC connection is available; if the current RRC connection is available, the user equipment may report the MDT measurement value to the network side through the current RRC connection; and if the current RRC connection is unavailable, the user equipment may first save the MDT measurement value, and may report, by using a handover message, a connection establishment message, a connection reestablishment message, or the like, the MDT measurement value to the network side when the RRC connection is available.

Therefore, in this embodiment of the present application, when the RRC connection is available, the MDT measurement value is reported to the base station, so that the MDT measurement value can correctly and timely reach the base station.

In this embodiment of the present application, the sending, by the user equipment, the MDT measurement value to the network side (a base station is used as an example for description) when determining that the RRC connection is available may include:

sending, by the user equipment, log available indication information to the base station when determining that the RRC connection is available, where the log available indication information is used to indicate that the MDT measurement value is stored;

receiving, by the user equipment, a user equipment information request message sent by the base station, where the user equipment information request message is used to request reporting of the MDT measurement value; and sending, by the user equipment according to the user equipment information request message, the MDT measurement value to the base station by using a user equipment response message.

Therefore, in this embodiment of the present application, a user equipment determines, according to an MDT triggering parameter, whether to acquire an MDT measurement value, where the MDT triggering parameter includes at least one of the following: an SINR, a data rate, a packet loss rate of a voice service, a data packet latency, or service interruption time; and when it is determined to acquire the MDT measurement, the user equipment acquires the MDT measurement value and sends the MDT measurement value to a base station. Because the MDT triggering parameter is directly related to experience of the user equipment, the user equipment is capable of determining, according to the MDT triggering parameter related to the experience of the user equipment, whether it is necessary to acquire the MDT measurement value currently; and when the user equipment needs to acquire a MDT measurement value, the user equipment acquires the MDT measurement value and reports the MDT measurement value to a network side, instead of simply performing an MDT task and reporting the MDT measurement value according to configuration on the network side without considering the experience of the user equipment in the prior art. In this way, burdens on an air interface and the network side can be reduced, a network problem faced by the user equipment can be responded to more quickly, and user experience can be improved.

Figure 2:
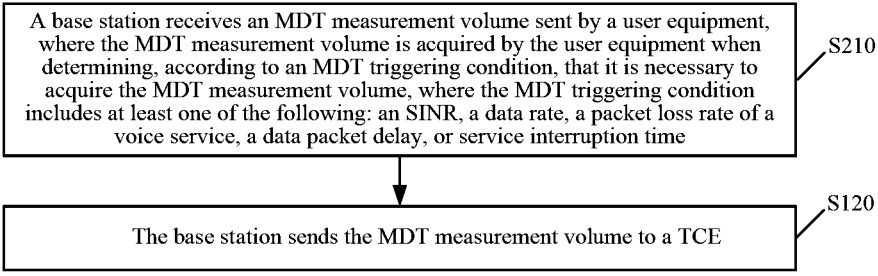
FIG. 2 is a schematic flowchart of an MDT measurement method according to another embodiment of the present application.

The foregoing describes the MDT measurement method according to this embodiment of the present application from a user equipment side, and the following describes an MDT measurement method 200 from a base station side with reference to FIG. 2. As shown in FIG. 2, the method 200 includes:

S210: A base station receives an MDT measurement value sent by a user equipment, where the MDT measurement value is acquired by the user equipment when determining, according to an MDT triggering parameter, that the MDT measurement value needs to be acquired, and the MDT triggering parameter includes at least one of the following: an SINR, a data rate, a packet loss rate of a voice service, a data packet latency, or service interruption time.

S220: The base station sends the MDT measurement value to a TCE.

In this embodiment of the present application, before the receiving the MDT measurement value sent by the user equipment in S210, the method 200 may further include:

S230: The base station sends the MDT triggering parameter to the user equipment.

In this embodiment of the present application, before the sending the MDT triggering parameter to the user equipment, the method 200 may further include:

S240: Determine the user equipment according to at least one of the following: a capability of the user equipment, a version of the user equipment, a remaining battery level of the user equipment, and strength of an uplink transmit signal of the user equipment.

In this embodiment of the present application, the MDT measurement value may include at least one of the following: location information of the user equipment, RSRP of a serving cell, an SINR of the serving cell, RSRP of a neighboring cell, an SINR of the neighboring cell, service throughput, a service delay, and a service type (such as a name of the service type and a category to which the service type belongs).

Therefore, in this embodiment of the present application, an MDT measurement value acquired by a user equipment according to an MDT triggering parameter is received, where the MDT triggering parameter includes at least one of the following: an SINR, a data rate, a packet loss rate of a voice service, a data packet latency, or service interruption time; and the MDT measurement value is sent to a trace collection entity TCE, so that a network problem faced by the user equipment can be responded to more quickly, and user experience can be improved. Furthermore, after acquiring the MDT measurement value, the TCE is capable of processing MDT values from multiple cells in a centralized manner and is capable of performing network analysis for the multiple cells in a centralized manner, so as to timely optimize a network.

Figure 3:
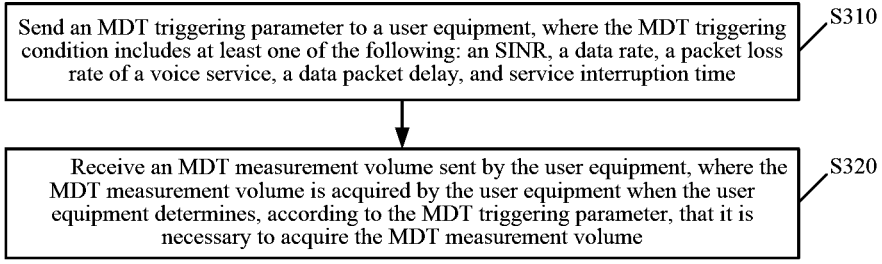
FIG. 3 is a schematic flowchart of an MDT measurement method according to another embodiment of the present application.

FIG. 3 is a schematic flowchart of an MDT measurement method 300 described from a network side according to an embodiment of the present application. The method 300 may be performed by a base station or an EMS. As shown in FIG. 3, the method 300 includes:

S310: Send an MDT triggering parameter to a user equipment, where the MDT triggering parameter includes at least one of the following: an SINR, a data rate, a packet loss rate of a voice service, a data packet latency, and service interruption time.

S320: Receive an MDT measurement value sent by the user equipment, where the MDT measurement value is acquired by the user equipment when the user equipment determines to acquire the MDT measurement value according to the MDT triggering parameter.

Alternatively, before the sending the MDT triggering parameter to the user equipment, the method 300 may further include:

S330: Determine the user equipment according to at least one of the following: a capability of the user equipment, a version of the user equipment, a remaining battery level of the user equipment, and strength of an uplink transmit signal of the user equipment.

Alternatively, the method 300 may further include:

S340: Send the received MDT measurement value to a TCE.

With application of the technical solution provided in this embodiment of the present application, because the MDT triggering parameter is directly related to experience of a user equipment, the user equipment is capable of determining, according to the MDT triggering parameter related to the experience of the user equipment, whether it is necessary to acquire an MDT measurement value currently; and when the user equipment needs to acquire MDT measurement, the user equipment acquires the MDT measurement value and reports the MDT measurement value to a network side, instead of simply performing an MDT task and reporting the MDT measurement value according to configuration on the network side without considering the experience of the user equipment in the prior art. In this way, burdens on an air interface and the network side can be reduced, a network problem faced by the user equipment can be responded to more quickly, and user experience can be improved. Furthermore, a TCE receives MDT measurement values of user equipments in multiple cells, all the multiple cells may not be located under a same base station, and the TCE is capable of performing network analysis for the multiple cells in a centralized manner, so as to timely optimize a network.

The foregoing describes the MDT measurement methods according to the embodiments of the present application with reference to FIG. 1 to FIG. 3 and from a user equipment side, a base station side, and an EMS side, respectively; and the following describes in more detail MDT measurement methods according to embodiments of the present application with reference to FIG. 4 to FIG. 7 and in interactive manners.

Figure 4:
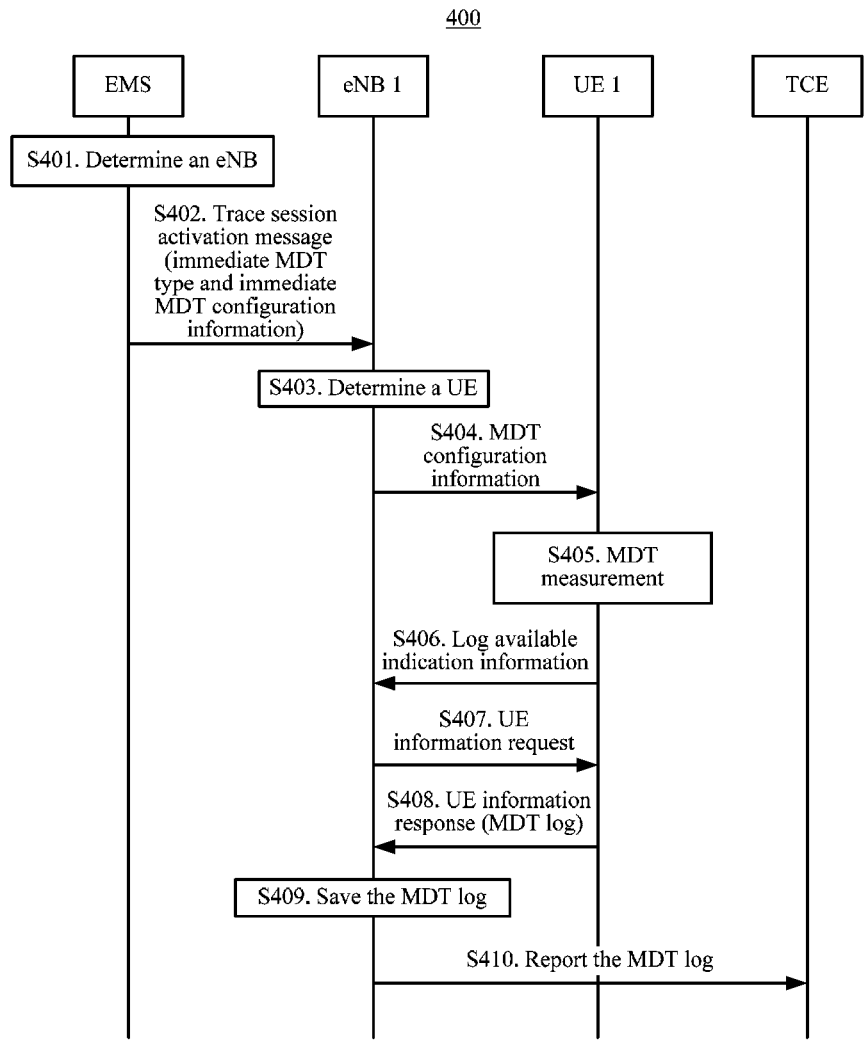
FIG. 4 is a schematic flowchart of an MDT measurement method according to another embodiment of the present application.

FIG. 4 is a schematic flowchart of an MDT measurement method 400 according to an embodiment of the present application. As shown in FIG. 4, the method 400 includes:

S401: An EMS determines that it is necessary to perform MDT measurement for a cell served by eNB 1 (eNB 1 may be a newly deployed base station, a base station that needs to be optimized, or a randomly selected base station).

S402: The EMS sends a trace session activation message to eNB 1, where the trace session activation message carries an immediate MDT measurement type, and immediate MDT configuration information (which may include an immediate MDT triggering parameter and an indication about immediate MDT content to be measured), where the immediate MDT triggering parameter includes at least one of the following: an SINR, a data rate, a packet loss rate of a voice service, a data packet latency, or service interruption time.

In this embodiment of the present application, an MDT triggering parameter is used as a basis for determining, by a user equipment, whether to acquire an MDT measurement value, and when the MDT triggering parameter meets a preset condition set in a system, the user equipment is capable of acquiring the MDT measurement value and sending the MDT measurement value to a network side, where the preset condition may be formulated according to an operator's policy, system bandwidth, a user requirement, a system configuration requirement, a capability of the user equipment, and the like. And the preset condition may be a threshold or a value set. For a different MDT triggering parameter, the preset condition may be different, which can be specifically determined according to an actual situation and is not limited in this embodiment of the present application.

S403: After receiving the trace session activation message sent by the EMS, eNB 1 determines, according to the immediate MDT measurement type carried in the trace session activation message, that a user equipment (User Equipment, "UE" for short) supported by eNB 1 needs to perform immediate MDT measurement, and then eNB 1 may select a UE that needs to perform MDT measurement, such as UE 1; and for details about how to select the user equipment, reference may be made to the descriptions in the foregoing methods.

S404: eNB 1 sends the MDT configuration information to UE 1. Alternatively, the MDT configuration information may be sent by using log measurement configuration information, an RRC connection reconfiguration message, or one or more other RRC messages.

S405: After the MDT configuration information sent by eNB 1 is received and when an MDT triggering parameter included in the MDT configuration information is met, UE 1 acquires an MDT measurement value based on the indication about the immediate MDT content to be measured, where the MDT measurement value may include at least one of the following: location information of UE 1, RSRP of a serving cell, an SINR of the serving cell, RSRP of a neighboring cell, an SINR of the neighboring cell, service throughput, a service delay, and a service type (such as a name of the service type and a category to which the service type belongs).

S406: After acquiring the MDT measurement value, UE 1 may record the MDT measurement value in a form of an MDT log and determine whether a current RRC connection is available; if the current RRC connection is interrupted, UE 1 may send log available indicator (Log Available Indicator) to a base station when the RRC connection is available; and if the current RRC connection is available, UE 1 may directly send the log available indicator to the base station through the current RRC connection.

S407: After receiving the log available indicator sent by UE 1, eNB 1 sends a UE information request message to UE 1.

S408: After receiving the UE information request message from eNB 1, UE 1 may send a UE response message to eNB 1, where the UE response message carries the MDT log.

S409: After receiving the UE response message sent by UE 1, eNB 1 saves the MDT log in the UE response message.

S410: eNB 1 reports the MDT log to a TCE.

Figure 5:
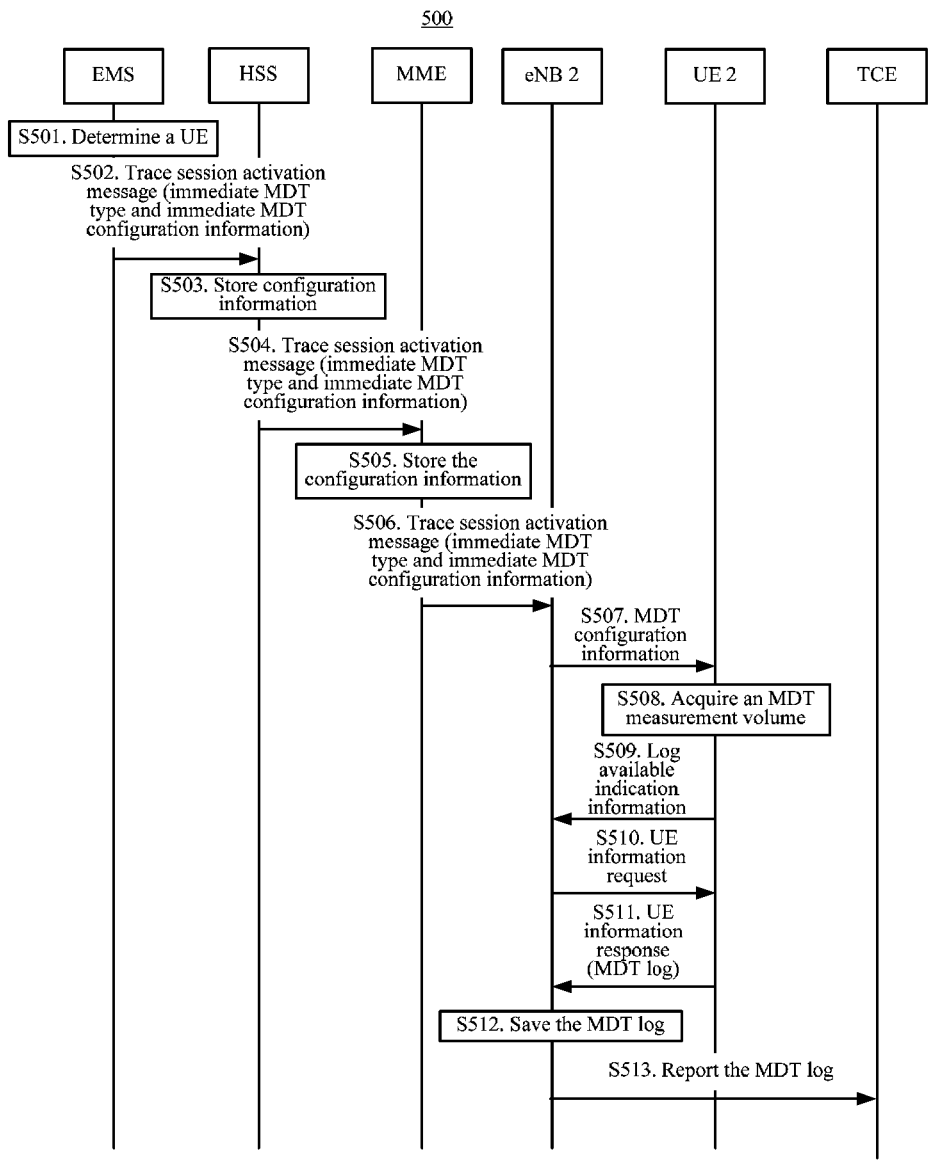
FIG. 5 is a schematic flowchart of an MDT measurement method according to another embodiment of the present application.

FIG. 5 is a schematic flowchart of an MDT measurement method 400 according to an embodiment of the present application. As shown in FIG. 5, the method 400 includes:

S501: An EMS determines a UE that needs to perform MDT measurement, such as UE 2 in a cell served by eNB 2, and for a specific selection manner, reference may be made to the description in the method 100.

S502: The EMS sends a trace session activation message to an HSS, where the trace session activation message carries an immediate MDT measurement type, MDT configuration information (that is, an immediate MDT triggering parameter and an indication about immediate MDT content to be measured), and information about UE 2, where the immediate MDT triggering parameter includes at least one of the following: an SINR, a data rate, a packet loss rate of a voice service, a data packet latency, or service interruption time.

In this embodiment of the present application, an MDT triggering parameter is used as a basis for determining, by a user equipment, whether to acquire an MDT measurement value, and when the MDT triggering parameter meets a preset condition set in a system, the user equipment is capable of acquiring the MDT measurement value and sending the MDT measurement value to a network side, where the preset condition may be formulated according to an operator's policy, system bandwidth, a user requirement, a system configuration requirement, a capability of the user equipment, and the like. And the preset condition may be a threshold or a value set. For a different MDT triggering parameter, the preset condition may be different, which can be specifically determined according to an actual situation and is not limited in this embodiment of the present application.

S503: After receiving the trace session activation message sent by the EMS, based on a network management requirement, the HSS may save the MDT configuration information and initiate an MDT session.

S504: The HSS sends the trace session activation message to an MME, where the trace session activation message carries the immediate MDT measurement type, the MDT configuration information (the immediate MDT triggering parameter and the indication about the immediate MDT content to be measured), and the information about UE 2.

S505: After receiving the trace session activation message sent by the HSS, based on the network management requirement, the MME may save the immediate MDT measurement type, the MDT configuration information (the immediate MDT triggering parameter and the indication about the immediate MDT content to be measured), and the information about UE 2 that are included in the trace session activation message, and initiate an MDT session.

S506: The MME sends the trace session activation message to eNB 2, where the trace session activation message carries the immediate MDT measurement type, the MDT configuration information (the immediate MDT triggering parameter and the indication about the immediate MDT content to be measured), and the information about UE 2.

S507: eNB 2 selects UE 2 according to the information about UE 2 and sends the MDT configuration information (that is, the immediate MDT triggering parameter and the indication about the immediate MDT content to be measured).

S508: After the MDT configuration information sent by eNB 2 is received and when the immediate MDT triggering parameter meets a preset condition in a system, UE 2 acquires an MDT measurement value based on the indication about the immediate MDT content to be measured, where the MDT measurement value may include at least one of the following: location information of UE 2, RSRP of a serving cell, an SINR of the serving cell, RSRP of a neighboring cell, an SINR of the neighboring cell, service throughput, a service delay, and detailed service information.

S509: After acquiring the MDT measurement value, UE 2 may record the MDT measurement value in a form of an MDT log and determine whether a current RRC connection is available; if the current RRC connection is interrupted, UE 2 may send log available indicator to a base station when the RRC connection is available; and if the current RRC connection is available, UE 2 may directly send the log available indicator to the base station through the current RRC connection.

S510: After receiving the log available indicator sent by UE 2, eNB 2 sends a UE information request message to UE 2.

S511: After receiving the UE information request message from eNB 2, UE 2 may send a UE response message to eNB 2, where the UE response message carries the MDT log.

S512: After receiving the UE response message sent by UE 2, eNB 2 saves the MDT log in the UE response message.

S513: eNB 2 reports the MDT log to a TCE.

Figure 6:
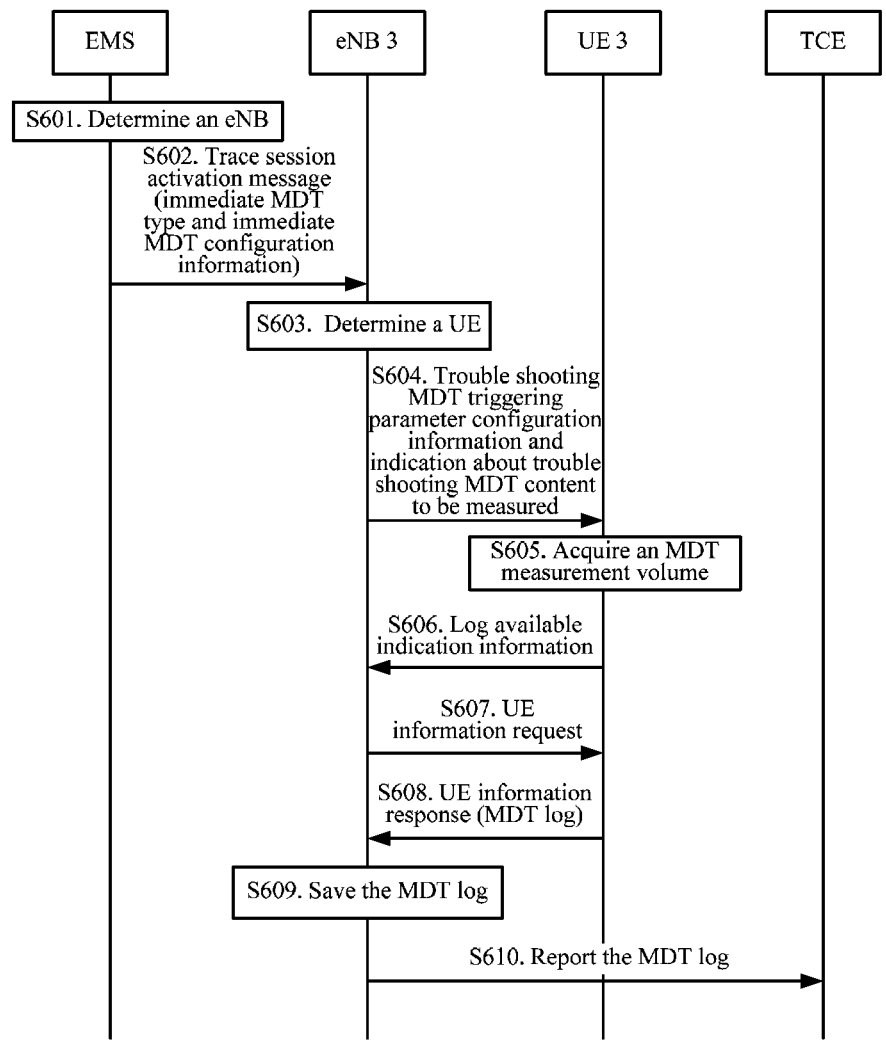
FIG. 6 is a schematic flowchart of an MDT measurement method according to another embodiment of the present application.

FIG. 6 is a schematic flowchart of an MDT measurement method 600 according to an embodiment of the present application. As shown in FIG. 6, the method 600 includes:

S601: An EMS determines that it is necessary to perform MDT measurement for a cell served by eNB 3 (eNB 3 may be a newly deployed base station, a base station that needs to be optimized, or a randomly selected base station).

S602: The EMS sends a trace session activation message to eNB 3, where the trace session activation message carries a Troubleshooting MDT measurement type and Troubleshooting MDT configuration information (including a Troubleshooting MDT triggering parameter and an indication about Troubleshooting MDT content to be measured), where the Troubleshooting MDT triggering parameter includes at least one of the following: a signal to interference plus noise ratio, a data rate, a packet loss rate of a voice service, a data packet latency, or service interruption time.

In this embodiment of the present application, an MDT triggering parameter is used as a basis for determining, by a user equipment, whether to acquire an MDT measurement value, and when the MDT triggering parameter meets a preset condition set in a system, the user equipment is capable of acquiring the MDT measurement value and sending the MDT measurement value to a network side, where the preset condition may be formulated according to an operator's policy, system bandwidth, a user requirement, a system configuration requirement, a capability of the user equipment, and the like. And the preset condition may be a threshold or a value set. For a different MDT triggering parameter, the preset condition may be different, which can be specifically determined according to an actual situation and is not limited in this embodiment of the present application.

S603: After receiving the trace session activation message sent by the EMS, eNB 3 may select a UE, such as UE 3, which needs to perform Troubleshooting MDT measurement; and for details about how to select the UE, reference may be made to the description in the foregoing method 100.

S604: eNB 3 sends the MDT configuration information that includes the Troubleshooting MDT triggering parameter and the indication about the Troubleshooting MDT content to be measured to UE 3.

S605: After the MDT configuration information from eNB 3 is received and when the Troubleshooting MDT triggering parameter is met, UE 3 acquires an MDT measurement value based on the indication about the Troubleshooting MDT content to be measured, where the MDT measurement value may include at least one of the following: location information of UE 3, RSRP of a serving cell, an SINR of the serving cell, RSRP of a neighboring cell, an SINR of the neighboring cell, service throughput, a service delay, and a service type.

S606: After acquiring the MDT measurement value, UE 3 may record the MDT measurement value in a form of an MDT log and determine whether a current RRC connection is available; if the current RRC connection is interrupted, UE 3 may send log available indicator (Log Available Indicator) to a base station when the RRC connection is available; and if the current RRC connection is available, UE 3 may directly send the log available indicator to the base station through the current RRC connection.

S607: After receiving the log available indicator sent by UE 3, eNB 3 sends a UE information request message to UE 3.

S608: After receiving the UE information request message from eNB 3, UE 3 may send a UE response message to eNB 3, where the UE response message carries the MDT log.

S609: After receiving the UE response message sent by UE 3, eNB 3 saves the MDT log in the UE response message.

S610: eNB 3 reports the MDT log to a TCE.

Figure 7:
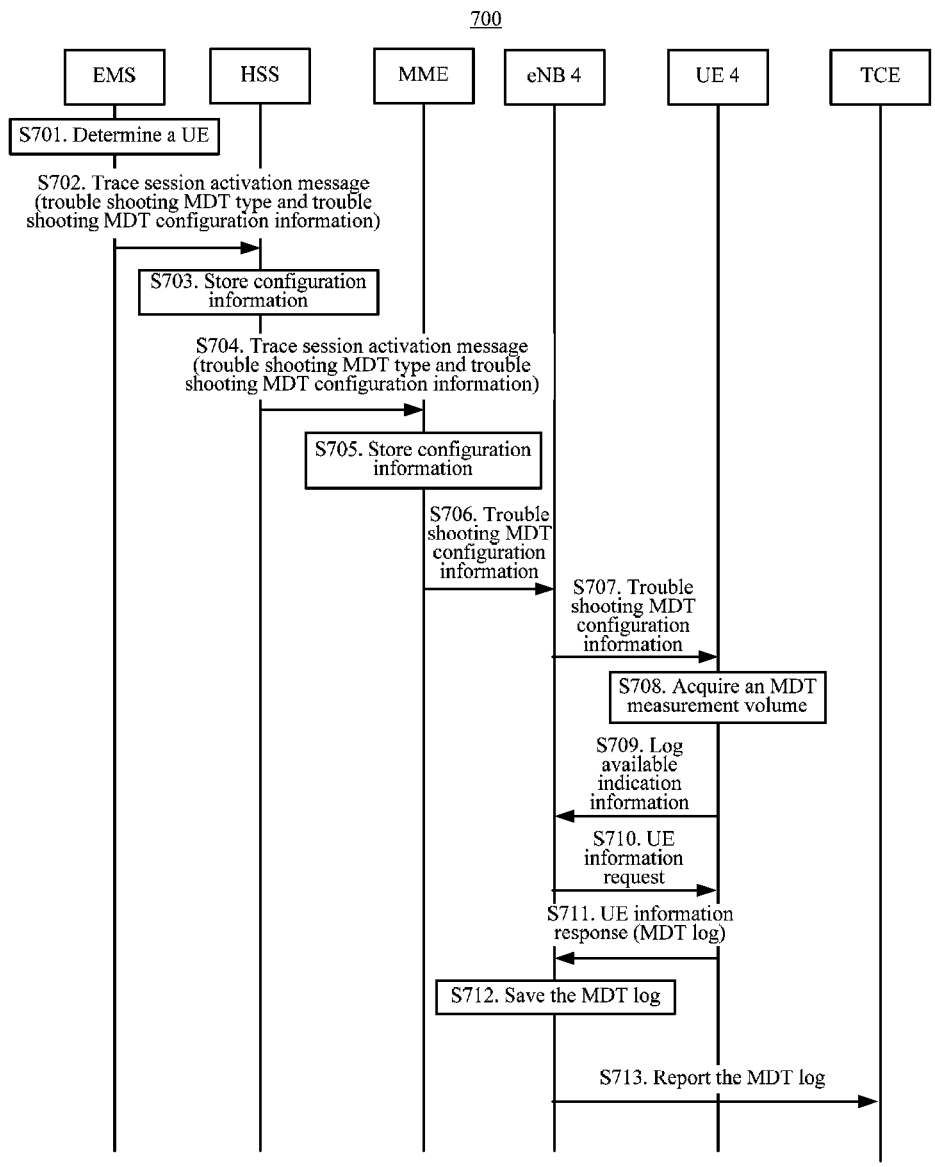
FIG. 7 is a schematic flowchart of an MDT measurement method according to another embodiment of the present application.

FIG. 7 is a schematic flowchart of an MDT measurement method 700 according to an embodiment of the present application. As shown in FIG. 7, the method 700 includes:

S701: An EMS determines a UE that needs to perform MDT measurement, such as UE 4 in a cell served by eNB 4, and for a specific selection manner, reference may be made to the description in the method 100.

S702: The EMS sends a trace session activation message to an HSS, where the trace session activation message carries a Troubleshooting MDT measurement type, Troubleshooting MDT configuration information (including a Troubleshooting MDT triggering parameter and an indication about Troubleshooting MDT content to be measured), and information about UE 4, and the Troubleshooting MDT triggering parameter includes at least one of the following: a signal to interference plus noise ratio, a data rate, a packet loss rate of a voice service, a data packet latency, or service interruption time.

In this embodiment of the present application, an MDT triggering parameter is used as a basis for determining, by a user equipment, whether to acquire an MDT measurement value, and when the MDT triggering parameter meets a preset condition set in a system, the user equipment is capable of acquiring the MDT measurement value and sending the MDT measurement value to a network side, where the preset condition may be formulated according to an operator's policy, system bandwidth, a user requirement, a system configuration requirement, a capability of the user equipment, and the like. And The preset condition may be a threshold or a value set. For a different MDT triggering parameter, the preset condition may be different, which can be specifically determined according to an actual situation and is not limited in this embodiment of the present application.

S703: After receiving the trace session activation message sent by the EMS, based on a network management requirement, the HSS may save the MDT configuration information and initiate an MDT session.

S704: The HSS sends the trace session activation message to an MME, where the trace session activation message carries the Troubleshooting MDT measurement type, the Troubleshooting MDT configuration information (including the Troubleshooting MDT triggering parameter and the indication about the Troubleshooting MDT content to be measured), and the information about UE 4.

S705: After receiving the trace session activation message sent by the HSS, based on the network management requirement, the MME may save the MDT configuration information and initiate an MDT session.

S706: The MME sends the trace session activation message to eNB 4, where the trace session activation message carries the Troubleshooting MDT measurement type, the Troubleshooting MDT configuration information (including the Troubleshooting MDT triggering parameter and the indication about the Troubleshooting MDT content to be measured), and the information about UE 4.

S707: eNB 4 sends the MDT configuration information (that is, including the Troubleshooting MDT triggering parameter and the indication about the Troubleshooting MDT content to be measured) to a UE selected by the EMS, that is, UE 4.

S708: After the MDT configuration information sent by eNB 4 is received and when the Troubleshooting MDT triggering parameter meets a preset condition in a system, UE 4 acquires an MDT measurement value based on the indication about the Troubleshooting MDT content to be measured, where the MDT measurement value may include at least one of the following: location information of UE 4, RSRP of a serving cell, an SINR of the serving cell, RSRP of a neighboring cell, an SINR of the neighboring cell, service throughput, a service delay, and a service type.

S709: After acquiring the MDT measurement value, UE 4 may record the MDT measurement value in a form of an MDT log and determine whether a current RRC connection is available; if the current RRC connection is interrupted, UE 4 may send log available indicator to a base station when the RRC connection is available; and if the current RRC connection is available, UE 4 may directly send the log available indicator to the base station through the current RRC connection.

S710: After receiving the log available indicator sent by UE 4, eNB 4 sends a UE information request message to UE 4.

S711: After receiving the UE information request message from eNB 4, UE 4 may send a UE response message to eNB 4, where the UE response message carries the MDT log.

S712: After receiving the UE response message sent by UE 4, eNB 4 saves the MDT log in the UE response message.

S713: eNB 4 reports the MDT log to a TCE.

It should be understood that the method 400 to the method 700 shown in FIG. 4 to FIG. 7 are merely specific implementation manners of the embodiments of the present application, and the embodiments of the present application may have other implementation manners, which are not limited in the embodiments of the present application.

With application of the technical solution provided in this embodiment of the present application, because the MDT triggering parameter is directly related to experience of a user equipment, the user equipment is capable of determining, according to the MDT triggering parameter related to the experience of the user equipment, whether it is necessary to acquire an MDT measurement value currently; and when the user equipment needs to acquire MDT measurement, the user equipment acquires the MDT measurement value and reports the MDT measurement value to a network side, instead of simply performing an MDT task and reporting the MDT measurement value according to configuration on the network side without considering the experience of the user equipment in the prior art. In this way, burdens on an air interface and the network side can be reduced, a network problem faced by the user equipment can be responded to more quickly, and user experience can be improved. Furthermore, a TCE receives MDT measurement values of user equipments in multiple cells, all the multiple cells may not be located under a same base station, and the TCE is capable of performing network analysis for the multiple cells in a centralized manner, so as to timely optimize a network.

The foregoing describes the MDT measurement methods according to the embodiments of the present application with reference to FIG. 1 to FIG. 7. The following describes apparatuses according to embodiments of the present application with reference to FIG. 8 to FIG. 16, including: a user equipment, a base station, and a network-side device (a base station or an EMS).

Figure 8:
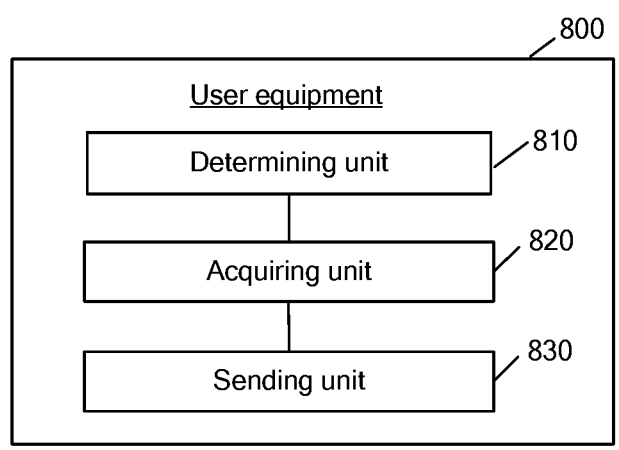
FIG. 8 is a schematic block diagram of a user equipment according to an embodiment of the present application.

FIG. 8 is a schematic block diagram of a user equipment 800 according to an embodiment of the present application. As shown in FIG. 8, the user equipment 800 includes:

a determining unit 810, configured to determine, according to an MDT triggering parameter, whether to acquire an MDT measurement value, where the MDT triggering parameter includes at least one of the following: an SINR, a data rate, a packet loss rate of a voice service, a data packet latency, or service interruption time;

an acquiring unit 820, configured to acquire the MDT measurement value when the determining unit 810 determines to acquire the MDT measurement value; and a sending unit 830, sending the MDT measurement value acquired by the acquiring unit 820 to a network side.

In this embodiment of the present application, the MDT triggering parameter may include at least one of the following: the signal to interference plus noise ratio, the data rate, the packet loss rate of the voice service, the data packet latency, or the service interruption time. The MDT triggering parameter indicates the SINR, the data rate, the packet loss rate of the voice service, the data packet latency, or the service interruption time (interruption time of the voice service or interruption time of a data service) that can trigger the user equipment to acquire the MDT measurement value.

In this embodiment of the present application, an MDT triggering parameter is used as a basis for determining, by a user equipment, whether to acquire an MDT measurement value, and when the MDT triggering parameter meets a preset condition set in a system, the user equipment is capable of acquiring the MDT measurement value and sending the MDT measurement value to a network side, where the preset condition may be formulated according to an operator's policy, system bandwidth, a user requirement, a system configuration requirement, a capability of the user equipment, and the like. And the preset condition may be a threshold or a value set. For a different MDT triggering parameter, the preset condition may be different, which can be specifically determined according to an actual situation and is not limited in this embodiment of the present application.

Figure 9:
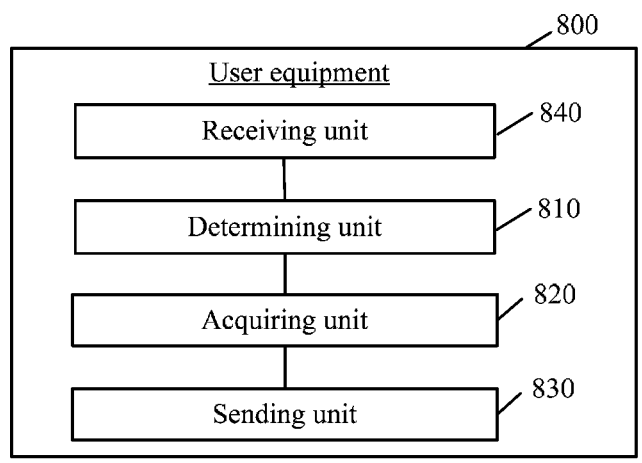
FIG. 9 is a schematic block diagram of a user equipment according to another embodiment of the present application.

In this embodiment of the present application, as shown in FIG. 9, the user equipment 800 may further include:

a receiving unit 840, configured to receive an instruction, where the instruction is used to indicate the MDT triggering parameter.

In this embodiment of the present application, the MDT triggering parameter may be actively sent by a base station to the user equipment, may be configured for the user equipment by using a manual instruction by using a human-computer interaction interface of the user equipment, and certainly, may also be preconfigured during delivery of the user equipment; and this embodiment of the present application is not limited thereto.

In this embodiment of the present application, the MDT measurement value may include at least one of the following: location information of the user equipment, RSRP of a serving cell, an SINR of the serving cell, RSRP of a neighboring cell, an SINR of the neighboring cell, service throughput, a service delay, and detailed service information.

For hardware implementation, the sending unit 830 may be a transmitter or a transceiver, the receiving unit 840 may be a receiver or a transceiver, and the sending unit 830 and the receiving unit 840 may be integrated together to form a transceiver unit, which is a transceiver in the hardware implementation. The determining unit 810 and the acquiring unit 820 may be embedded, in a form of hardware, in or independent of a processor of the user equipment 800, or may be stored in a memory of the user equipment 800 in a form of software, so that the processor invokes and performs an operation corresponding to each of the foregoing units. The processor may be a central processing unit ("CPU" for short), a microprocessor, a single-chip microcomputer, or the like.

It should be understood that the user equipment 800 according to this embodiment of the present application may be corresponding to the user equipments in the MDT measurement methods in the embodiments of the present application, and the foregoing operations and one or more other operations and/or functions of each unit in the user equipment 800 are intended to implement corresponding processes of the methods in FIG. 1 and FIG. 4 to FIG. 7 separately; and for brevity, no further details are provided herein.

With application of the technical solution provided in this embodiment of the present application, because the MDT triggering parameter is directly related to experience of a user equipment, the user equipment is capable of determining, according to the MDT triggering parameter related to the experience of the user equipment, whether it is necessary to acquire an MDT measurement value currently; and when the user equipment needs to acquire MDT measurement, the user equipment acquires the MDT measurement value and reports the MDT measurement value to a network side, instead of simply performing an MDT task and reporting the MDT measurement value according to configuration on the network side without considering the experience of the user equipment in the prior art. In this way, burdens on an air interface and the network side can be reduced, a network problem faced by the user equipment can be responded to more quickly, and user experience can be improved.

Figure 10:
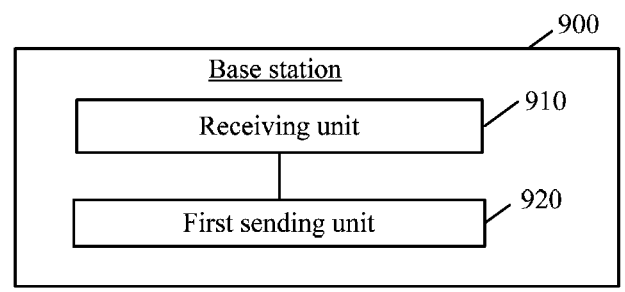
FIG. 10 is a schematic block diagram of a base station according to an embodiment of the present application.

FIG. 10 is a schematic block diagram of a base station 900 according to an embodiment of the present application. As shown in FIG. 10, the base station 900 includes:

a receiving unit 910, configured to receive an MDT measurement value sent by a user equipment, where the MDT measurement value is acquired by the user equipment according to an MDT triggering parameter, and the MDT triggering parameter includes at least one of the following: an SINR, a data rate, a packet loss rate of a voice service, a data packet latency, or service interruption time; and a first sending unit 920, configured to send the MDT measurement value received by the receiving unit 910 to a TCE.

In this embodiment of the present application, the MDT triggering parameter may include at least one of the following: the signal to interference plus noise ratio, the data rate, the packet loss rate of the voice service, the data packet latency, or the service interruption time. The MDT triggering parameter indicates the SINR, the data rate, the packet loss rate of the voice service, the data packet latency, or the service interruption time (interruption time of the voice service or interruption time of a data service) that can trigger the user equipment to acquire the MDT measurement value.

In this embodiment of the present application, an MDT triggering parameter is used as a basis for determining, by a user equipment, whether to acquire an MDT measurement value, and when the MDT triggering parameter meets a preset condition set in a system, the user equipment is capable of acquiring the MDT measurement value and sending the MDT measurement value to a network side, where the preset condition may be formulated according to an operator's policy, system bandwidth, a user requirement, a system configuration requirement, a capability of the user equipment, and the like. And the preset condition may be a threshold or a value set. For a different MDT triggering parameter, the preset condition may be different, which can be specifically determined according to an actual situation and is not limited in this embodiment of the present application.

Figure 11:
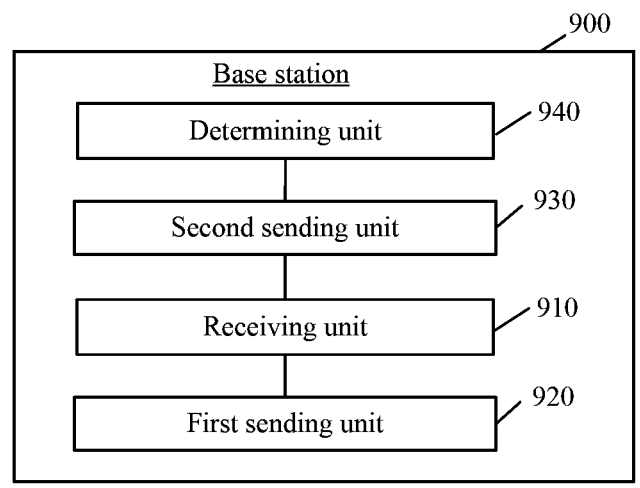
FIG. 11 is a schematic block diagram of a base station according to another embodiment of the present application.

In this embodiment of the present application, as shown in FIG. 11, the base station 900 may further include:

a second sending unit 930, configured to send an instruction to the user equipment, where the instruction is used to indicate the MDT triggering parameter.

In this embodiment of the present application, as shown in FIG. 11, the base station 900 may further include:

a determining unit 940, configured to determine the user equipment according to at least one of the following: a capability of the user equipment, a version of the user equipment, a remaining battery level of the user equipment, and strength of an uplink transmit signal of the user equipment.

In this embodiment of the present application, the MDT measurement value may include at least one of the following: location information of the user equipment, RSRP of a serving cell, an SINR of the serving cell, RSRP of a neighboring cell, an SINR of the neighboring cell, service throughput, a service delay, and detailed service information.

For hardware implementation, the first sending unit 920 and the second sending unit 930 may be transmitters or transceivers, the receiving unit 910 may be a receiver or a transceiver, and the first sending unit 920, the second sending unit 930, and the receiving unit 910 may be integrated together to form a transceiver unit, which is a transceiver in the hardware implementation. The determining unit 940 may be embedded, in a form of hardware, in or independent of a processor of the base station 900, or may be stored in a memory of the base station 900 in a form of software, so that the processor invokes and performs an operation corresponding to each of the foregoing units. The processor may be a CPU, a microprocessor, a single-chip microcomputer, or the like.

It should be understood that the base station 900 according to this embodiment of the present application may be corresponding to the base stations in the MDT measurement methods in the embodiments of the present application, and the foregoing operations and one or more other operations and/or functions of each unit in the base station 900 are intended to implement corresponding processes of the methods in FIG. 2 and FIG. 4 to FIG. 7 separately; and for brevity, no further details are provided herein.

With application of the technical solution provided in this embodiment of the present application, because the MDT triggering parameter is directly related to experience of a user equipment, the user equipment is capable of determining, according to the MDT triggering parameter related to the experience of the user equipment, whether it is necessary to acquire an MDT measurement value currently; and when the user equipment needs to acquire MDT measurement, the user equipment acquires the MDT measurement value and reports the MDT measurement value to a network side, instead of simply performing an MDT task and reporting the MDT measurement value according to configuration on the network side without considering the experience of the user equipment in the prior art. In this way, burdens on an air interface and the network side can be reduced, a network problem faced by the user equipment can be responded to more quickly, and user experience can be improved.

Figure 12:
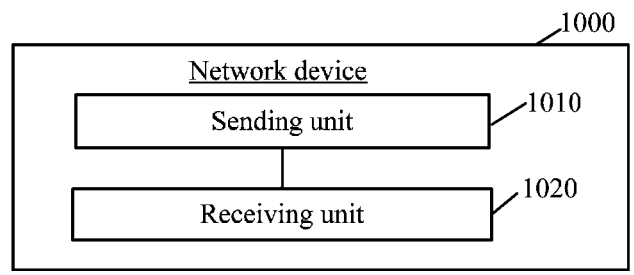
FIG. 12 is a schematic block diagram of a network device according to an embodiment of the present application.

FIG. 12 is a schematic block diagram of a network device 1000 according to an embodiment of the present application. As shown in FIG. 12, the network device 1000 may be a base station or an EMS and includes:

a sending unit 1010, configured to send an MDT triggering parameter to a user equipment, where the MDT triggering parameter includes at least one of the following: a signal to interference plus noise ratio SINR, a data rate, a packet loss rate of a voice service, a data packet latency, and service interruption time; and a receiving unit 1020, configured to receive an MDT measurement value sent by the user equipment, where the MDT measurement value is acquired by the user equipment when the user equipment determines to acquire the MDT measurement value according to the MDT triggering parameter.

In this embodiment of the present application, an MDT triggering parameter is used as a basis for determining, by a user equipment, whether to acquire an MDT measurement value, and when the MDT triggering parameter meets a preset condition set in a system, the user equipment is capable of acquiring the MDT measurement value and sending the MDT measurement value to a network side, where the preset condition may be formulated according to an operator's policy, system bandwidth, a user requirement, a system configuration requirement, a capability of the user equipment, and the like. And the preset condition may be a threshold or a value set. For a different MDT triggering parameter, the preset condition may be different, which can be specifically determined according to an actual situation and is not limited in this embodiment of the present application.

Optionally, the sending unit 1010 may further be configured to send the MDT measurement value to a TCE.

Figure 13:
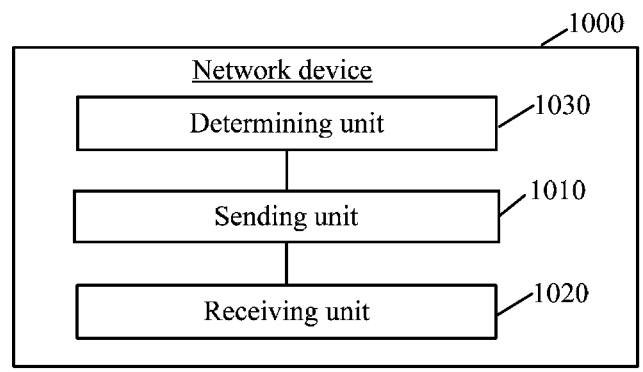
FIG. 13 is a schematic block diagram of a network-side device according to another embodiment of the present application.

Optionally, as shown in FIG. 13, the network-side device 1000 may further include:

a determining unit 1030, configured to determine the user equipment according to at least one of the following: a capability of the user equipment, a version of the user equipment, a remaining battery level of the user equipment, and strength of an uplink transmit signal of the user equipment.

In this embodiment of the present application, the network-side device may a base station or an EMS.

For hardware implementation, the sending unit 1010 may be a transmitter or a transceiver, and the receiving unit may be a receiver or a transceiver. The determining unit 1030 may be embedded, in a form of hardware, in or independent of a processor of the network-side device 1000, or may be stored in a memory of the network-side device 1000 in a form of software, so that the processor invokes and performs an operation corresponding to each of the foregoing units. The processor may be a CPU, a microprocessor, a single-chip microcomputer, or the like.

It should be understood that the network device 1000 according to this embodiment of the present application may be corresponding to the network devices (base stations or EMSs) in the MDT measurement methods in the embodiments of the present application, and the foregoing operations and one or more other operations and/or functions of each unit in the network device 1000 are intended to implement corresponding processes of the methods in FIG. 3 and FIG. 4 to FIG. 7 separately; and for brevity, no further details are provided herein.

With application of the technical solution provided in this embodiment of the present application, because the MDT triggering parameter is directly related to experience of a user equipment, the user equipment is capable of determining, according to the MDT triggering parameter related to the experience of the user equipment, whether it is necessary to acquire an MDT measurement value currently; and when the user equipment needs to acquire MDT measurement, the user equipment acquires the MDT measurement value and reports the MDT measurement value to a network side, instead of simply performing an MDT task and reporting the MDT measurement value according to configuration on the network side without considering the experience of the user equipment in the prior art. In this way, burdens on an air interface and the network side can be reduced, a network problem faced by the user equipment can be responded to more quickly, and user experience can be improved. Furthermore, a TCE receives MDT measurement values of user equipments in multiple cells, all the multiple cells may not be located under a same base station, and the TCE is capable of performing network analysis for the multiple cells in a centralized manner, so as to timely optimize a network.

Figure 14:
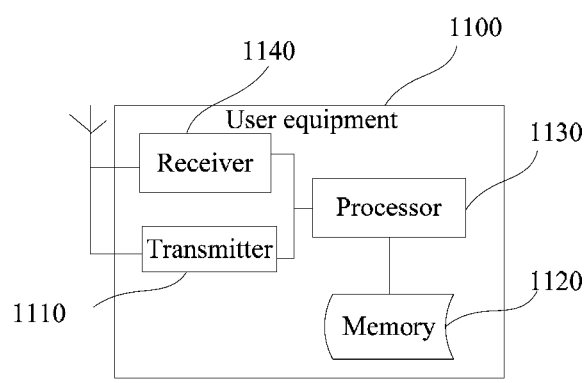
FIG. 14 is a schematic block diagram of a user equipment according to another embodiment of the present application.

FIG. 14 is a schematic block diagram of a user equipment 1100 according to an embodiment of the present application. As shown in FIG. 14, the user equipment 1100 may include a transmitter 1110, a memory 1120, and a processor 1130 that is connected to the transmitter 1110 and the memory 1120. Certainly, the user equipment 1100 may further include general parts, such as an antenna and an input/output apparatus, which are not limited in this embodiment of the present application.

The memory 1120 stores a group of program code, and the processor 1130 is configured to invoke the program code stored in the memory 1120 to perform the following operations:

determining, according to an MDT triggering parameter, whether to acquire an MDT measurement value, where the MDT triggering parameter includes at least one of the following: an SINR, a data rate, a packet loss rate of a voice service, a data packet latency, or service interruption time;

acquiring the MDT measurement value when it is determined that the MDT measurement value needs to be acquired; and sending the MDT measurement value to a network side by using the transmitter 1110.

In this embodiment of the present application, an MDT triggering parameter is used as a basis for determining, by a user equipment, whether to acquire an MDT measurement value, and when the MDT triggering parameter meets a preset condition set in a system, the user equipment is capable of acquiring the MDT measurement value and sending the MDT measurement value to a network side, where the preset condition may be formulated according to an operator's policy, system bandwidth, a user requirement, a system configuration requirement, a capability of the user equipment, and the like, and may be a threshold or a value set. For a different MDT triggering parameter, the preset condition may be different, which can be specifically determined according to an actual situation and is not limited in this embodiment of the present application.

In this embodiment of the present application, as shown in FIG. 14, the user equipment may further include a receiver 1140, and the processor 1130 may further be configured to perform the following operation by invoking an instruction in the memory 1120:

receiving the MDT triggering parameter by using the receiver 1140.

Optionally, the processor 1130 may further receive, by using the receiver 1140, an indication about MDT content to be measured, where the indication about the MDT content to be measured is used to indicate an MDT measurement value measured by the user equipment.

In this embodiment of the present application, the MDT triggering parameter may be actively sent by a base station to the user equipment, may be sent by an EMS to the user equipment, may be configured for the user equipment by using a manual instruction by using a human-computer interaction interface of the user equipment, and certainly, may also be preconfigured during delivery of the user equipment; and this embodiment of the present application is not limited thereto.

In this embodiment of the present application, the MDT measurement value may include at least one of the following: location information of the user equipment, RSRP of a serving cell, an SINR of the serving cell, RSRP of a neighboring cell, an SINR of the neighboring cell, service throughput, a service delay, and detailed service information.

It should be understood that the user equipment 1100 according to this embodiment of the present application may be corresponding to the user equipments in the MDT measurement methods in the embodiments of the present application, and the foregoing operations and one or more other operations and/or functions of each part in the user equipment 1100 are intended to implement corresponding processes of the methods in FIG. 1 and FIG. 4 to FIG. 7 separately; and for brevity, no further details are provided herein.

With application of the technical solution provided in this embodiment of the present application, because the MDT triggering parameter is directly related to experience of a user equipment, the user equipment is capable of determining, according to the MDT triggering parameter related to the experience of the user equipment, whether it is necessary to acquire an MDT measurement value currently; and when the user equipment needs to acquire MDT measurement, the user equipment acquires the MDT measurement value and reports the MDT measurement value to a network side, instead of simply performing an MDT task and reporting the MDT measurement value according to configuration on the network side without considering the experience of the user equipment in the prior art. In this way, burdens on an air interface and the network side can be reduced, a network problem faced by the user equipment can be responded to more quickly, and user experience can be improved.

Figure 15:
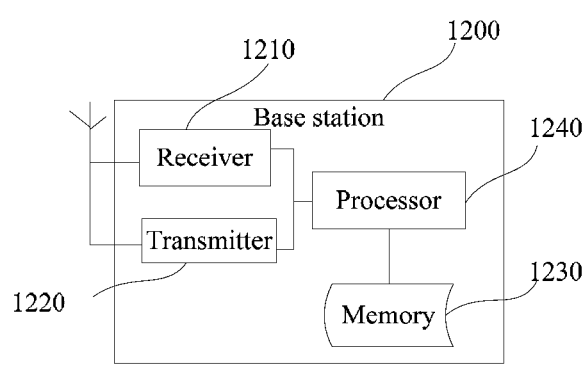
FIG. 15 is a schematic block diagram of a base station according to another embodiment of the present application.

FIG. 15 is a schematic block diagram of a base station 1200 according to an embodiment of the present application. As shown in FIG. 15, the base station 1200 may include a receiver 1210, a transmitter 1220, a memory 1230, and a processor 1240 that is connected to the receiver 1210, the transmitter 1220, and the memory 1230. Certainly, the base station may further include general parts, such as an antenna, a baseband processing part, a medium radio frequency processing part, and an input/output apparatus, which are not limited in this embodiment of the present application.

The memory 1230 stores a group of program code, and the processor 1240 may invoke the program code stored in the memory 1230 to perform the following operations:

receiving, by using the receiver 1210, an MDT measurement value sent by a user equipment, where the MDT measurement value is acquired by the user equipment according to an MDT triggering parameter, and the MDT triggering parameter includes at least one of the following: a signal to interference plus noise ratio SINR, a data rate, a packet loss rate of a voice service, a data packet latency, or service interruption time; and sending the MDT measurement value to a TCE by using the transmitter 1220.

In this embodiment of the present application, an MDT triggering parameter is used as a basis for determining, by a user equipment, whether to acquire an MDT measurement value, and when the MDT triggering parameter meets a preset condition set in a system, the user equipment is capable of acquiring the MDT measurement value and sending the MDT measurement value to a network side, where the preset condition may be formulated according to an operator's policy, system bandwidth, a user requirement, a system configuration requirement, a capability of the user equipment, and the like. And the preset condition may be a threshold or a value set. For a different MDT triggering parameter, the preset condition may be different, which can be specifically determined according to an actual situation and is not limited in this embodiment of the present application.

In this embodiment of the present application, the processor 1240 may further perform the following operation by invoking the program code stored in the memory 1230:

sending the MDT triggering parameter to the user equipment by using the transmitter 1220.

In this embodiment of the present application, the processor 1240 may further perform the following operation by invoking the program code stored in the memory 1230:

determining the user equipment according to at least one of the following: a capability of the user equipment, a version of the user equipment, a remaining battery level of the user equipment, and signal strength corresponding to information reported by the user equipment.

In this embodiment of the present application, the MDT measurement value may include at least one of the following: location information of the user equipment, reference signal received power RSRP of a serving cell, an SINR of the serving cell, RSRP of a neighboring cell, an SINR of the neighboring cell, service throughput, a service delay, and a service type.

It should be understood that the base station 1200 according to this embodiment of the present application may be corresponding to the base stations in the MDT measurement methods in the embodiments of the present application, and the foregoing operations and one or more other operations and/or functions of each part in the base station 1200 are intended to implement corresponding processes of the methods in FIG. 2 and FIG. 4 to FIG. 7 separately; and for brevity, no further details are provided herein.

With application of the technical solution provided in this embodiment of the present application, because the MDT triggering parameter is directly related to experience of a user equipment, the user equipment is capable of determining, according to the MDT triggering parameter related to the experience of the user equipment, whether it is necessary to acquire an MDT measurement value currently; and when the user equipment needs to acquire MDT measurement, the user equipment acquires the MDT measurement value and reports the MDT measurement value to a network side, instead of simply performing an MDT task and reporting the MDT measurement value according to configuration on the network side without considering the experience of the user equipment in the prior art. In this way, burdens on an air interface and the network side can be reduced, a network problem faced by the user equipment can be responded to more quickly, and user experience can be improved. Furthermore, a TCE receives MDT measurement values of user equipments in multiple cells, all the multiple cells may not be located under a same base station, and the TCE is capable of performing network analysis for the multiple cells in a centralized manner, so as to timely optimize a network.

Figure 16:
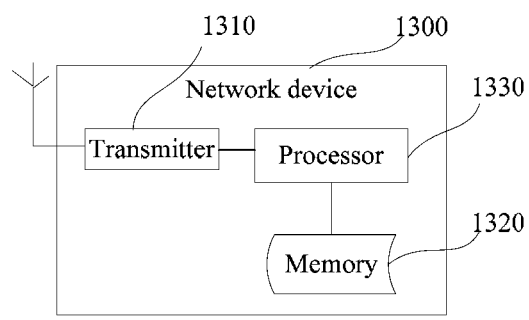
FIG. 16 is a schematic block diagram of a network-side device according to another embodiment of the present application.

FIG. 16 is a schematic block diagram of a network device 1300 according to an embodiment of the present application. As shown in FIG. 16, the network device 1300 may include a transmitter 1310, a memory 1320, and a processor 1330 that is connected to the transmitter 1310 and the memory 1320. Certainly, the network device may further include general parts, such as an antenna and an input/output apparatus, which are not limited in this embodiment of the present application.

The memory 1320 stores a group of program code, and the processor 1330 is configured to invoke the program code stored in the memory 1320 to perform the following operations:

sending an MDT triggering parameter to a user equipment by using the transmitter 1310, where the MDT triggering parameter includes at least one of the following: a signal to interference plus noise ratio SINR, a data rate, a packet loss rate of a voice service, a data packet latency, and service interruption time; and receiving an MDT measurement value sent by the user equipment, where the MDT measurement value is acquired by the user equipment when the user equipment determines to acquire the MDT measurement value according to the MDT triggering parameter.

In this embodiment of the present application, an MDT triggering parameter is used as a basis for determining, by a user equipment, whether to acquire an MDT measurement value, and when the MDT triggering parameter meets a preset condition set in a system, the user equipment is capable of acquiring the MDT measurement value and sending the MDT measurement value to a network side, where the preset condition may be formulated according to an operator's policy, system bandwidth, a user requirement, a system configuration requirement, a capability of the user equipment, and the like. And the preset condition may be a threshold or a value set. For a different MDT triggering parameter, the preset condition may be different, which can be specifically determined according to an actual situation and is not limited in this embodiment of the present application.

Optionally, the processor 1330 may further be configured to perform the following operation by invoking the program code stored in the memory 1320:

determining the user equipment according to at least one of the following: a capability of the user equipment, a version of the user equipment, a remaining battery level of the user equipment, and strength of an uplink transmit signal of the user equipment.

Optionally, the processor 1330 may further be configured to perform the following operation by invoking the program code stored in the memory 1320:

sending the received MDT measurement value to a TCE.

It should be understood that the network-side device 1300 according to this embodiment of the present application may be corresponding to the network-side devices (base stations or EMSs) in the MDT measurement methods in the embodiments of the present application, and the foregoing operations and one or more other operations and/or functions of each part on the network-side device 1300 are intended to implement corresponding processes of the methods in FIG. 3 and FIG. 4 to FIG. 7 separately; and for brevity, no further details are provided herein.

With application of the technical solution provided in this embodiment of the present application, because the MDT triggering parameter is directly related to experience of a user equipment, the user equipment is capable of determining, according to the MDT triggering parameter related to the experience of the user equipment, whether it is necessary to acquire an MDT measurement value currently; and when the user equipment needs to acquire MDT measurement, the user equipment acquires the MDT measurement value and reports the MDT measurement value to a network side, instead of simply performing an MDT task and reporting the MDT measurement value according to configuration on the network side without considering the experience of the user equipment in the prior art. In this way, burdens on an air interface and the network side can be reduced, a network problem faced by the user equipment can be responded to more quickly, and user experience can be improved. Furthermore, a TCE receives MDT measurement values of user equipments in multiple cells, all the multiple cells may not be located under a same base station, and the TCE is capable of performing network analysis for the multiple cells in a centralized manner, so as to timely optimize a network.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on multiple network units. A part of or all of the units may be selected according to actual needs to achieve the objectives of the solutions of the embodiments.

In addition, functional units in the embodiments of the present application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present application essentially, or the part contributing to the prior art, or part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present application. The foregoing storage medium includes: any mediums that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the appended claims.

What is claimed is:

1. A minimization of drive tests (MDT) measurement method comprising:
   receiving, by a user equipment, MDT configuration information that includes an MDT triggering parameter and indication of an MDT content to be measured;
   determining, by the user equipment, that the user equipment is capable of acquiring an MDT measurement value of the MDT content when the MDT triggering parameter meets a preset condition related to the triggering parameter,
      wherein the preset condition is formulated according to at least one of the following: an operator's policy, system bandwidth, a user requirement, a system configuration requirement, and a capability of the user equipment, and
      wherein the MDT triggering parameter comprises at least one of the following: a signal to interference plus noise ratio (SINR), a data rate, a packet loss rate of a voice service, a data packet latency, or a service interruption time;
   acquiring, by the user equipment, a measurement result of the MDT measurement value of the MDT content to be measured in response to determining the user equipment is capable of acquiring the MDT measurement value, wherein acquiring the MDT measurement value includes:
      determining, by the user equipment, according to the indication about the MDT content to be measured, whether a currently available measurement value exists for MDT content,
      when the currently available measurement value exists, the measurement result of currently available measurement value is read as the measurement result of the MDT measurement value, and
      when no currently available measurement value exists, the user equipment performs the MDT measurement, and acquires the measurement result of the MDT measurement value; and
   sending, by the user equipment, the measurement result of the MDT measurement value to a network side.

2. The method according to claim 1, wherein the MDT measurement value comprises at least one of the following: location information of the user equipment, a reference signal received power (RSRP) of a serving cell, an SINR of the serving cell, a RSRP of a neighboring cell, an SINR of the neighboring cell, a service throughput, a service delay, and a service type.

3. The method according to claim 1, wherein, the preset condition is a threshold or a value set.

4. The method according to claim 1, wherein the MDT triggering parameter is a service interruption time of the voice service or a service interruption time of a data service.

5. The method according to claim 1, wherein the MDT measurement value comprises a service type, the service type including a voice service or a data service.

6. A user equipment comprising:
   a processor;
   a receiver configured to cooperate with the processor to receive minimization of drive tests (MDT) configuration information that includes an MDT triggering parameter and indication of an MDT content to be measured;
   the processor configured to:
      determine that the user equipment is capable of acquiring an MDT measurement value of the MDT content when the MDT triggering parameter meets a preset condition related to the triggering parameter,
         wherein the preset condition is formulated according to at least one of the following: an operator's policy, system bandwidth, a user requirement, a system configuration requirement, and a capability of the user equipment, and
         wherein the MDT triggering parameter comprises at least one of the following: a signal to interference plus noise ratio (SINR), a data rate, a packet loss rate of a voice service, a data packet latency, or a service interruption time; and
      acquire a measurement result of the MDT measurement value of the MDT content to be measured in response to determining the user equipment is capable of acquiring the MDT measurement value, wherein acquiring the MDT measurement value includes:
         determining, according to the indication about the MDT content to be measured, whether a currently available measurement value exists for the MDT content,
         when the currently available measurement value exists, reading the measurement result of currently available measurement value as the measurement result of the MDT measurement value, and
         when no currently available measurement value exists, performing the MDT measurement, and acquiring the measurement result of the MDT measurement value; and
   a transmitter configured to cooperate with the processor to send the measurement result of the MDT measurement value to a network side.

7. The user equipment according to claim 6, wherein the MDT measurement value comprises at least one of the following: location information of the user equipment, a reference signal received power (RSRP) of a serving cell, an SINR of the serving cell, a RSRP of a neighboring cell, an SINR of the neighboring cell, a service throughput, a service delay, and a service type.

8. The user equipment according to claim 6, wherein, the preset condition is a threshold or a value set.

9. The user equipment according to claim 6, wherein the MDT triggering parameter is a service interruption time of the voice service or a service interruption time of a data service.

10. The user equipment according to claim 6, wherein the MDT measurement value comprises a service type, the service type including a voice service or a data service.

11. A network device comprising:
a processor configured to:
    select a user equipment for a minimization of drive tests (MDT) measurement, wherein the selection is made according to at least one of the following: a capability of the user equipment, a version of the user equipment, a remaining battery level of the user equipment, and a strength of an uplink transmit signal of the user equipment; and
    select an MDT triggering parameter related to experience of the selected user equipment, wherein the selected MDT triggering parameter may be different for different selected user equipment;
a transmitter configured to cooperate with the processor to send the MDT triggering parameter and an indication of an MDT content to be measured by a user equipment,
    wherein the MDT triggering parameter comprises at least one of the following: a signal to interference plus noise ratio (SINR), a data rate, a packet loss rate of a voice service, a data packet latency, and a service interruption time, and
    wherein the MDT content includes at least one of the following: location information of the user equipment, reference signal received power (RSRP) of a serving cell, an SINR of the serving cell, RSRP of a neighboring cell, an SINR of the neighboring cell, service throughput, a service delay and a service type; and
a receiver configured to cooperate with the processor to receive a measurement result of an MDT measurement value related to the MDT content sent by the user equipment,
    wherein the MDT measurement value is either (a) a MDT measurement value existing prior to the user equipment receiving the MDT trigger parameter and the indication of the MDT content or (b) is obtained in response to the MDT trigger parameter when there is no existing value.

12. The network device according to claim 11, wherein the transmitter is further configured to send the MDT measurement value to a trace collection entity (TCE).

13. The network device according to claim 11, wherein the MDT triggering parameter is a service interruption time of the voice service or a service Zinterruption time of a data service.

* * * * *